(12) United States Patent
Kodama et al.

(10) Patent No.: US 11,691,137 B2
(45) Date of Patent: Jul. 4, 2023

(54) CERAMIC POROUS BODY AND METHOD FOR PRODUCING THE SAME, AND DUST COLLECTING FILTER

(71) Applicant: NGK INSULATORS, LTD., Nagoya (JP)

(72) Inventors: Suguru Kodama, Nagoya (JP); Taira Hayakawa, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 299 days.

(21) Appl. No.: 16/829,075

(22) Filed: Mar. 25, 2020

(65) Prior Publication Data

US 2020/0306742 A1 Oct. 1, 2020

(30) Foreign Application Priority Data

Mar. 28, 2019 (JP) ................................. 2019-064889
Mar. 25, 2020 (JP) ................................. 2020-054282

(51) Int. Cl.

| | |
|---|---|
| *B01J 35/04* | (2006.01) |
| *B01D 46/24* | (2006.01) |
| *C04B 38/00* | (2006.01) |
| *B01J 27/224* | (2006.01) |
| *B01D 53/94* | (2006.01) |
| *B01J 21/18* | (2006.01) |

(52) U.S. Cl.
CPC .......... *B01J 35/04* (2013.01); *B01D 46/2429* (2013.01); *B01D 46/24491* (2021.08); *B01D 46/24492* (2021.08); *B01D 53/9418* (2013.01); *B01J 21/18* (2013.01); *B01J 27/224* (2013.01); *C04B 38/0009* (2013.01); *C04B 38/0016* (2013.01); *B01D 2279/30* (2013.01)

(58) Field of Classification Search
None
See application file for complete search history.

(56) References Cited

U.S. PATENT DOCUMENTS

| | | | |
|---|---|---|---|
| 2003/0024219 A1* | 2/2003 | Harada | ................ F01N 3/0222 55/523 |
| 2007/0119135 A1 | 5/2007 | Miao et al. | |
| 2008/0092499 A1 | 4/2008 | Otsuka et al. | |
| 2008/0110143 A1 | 5/2008 | Chen et al. | |
| 2018/0214810 A1* | 8/2018 | Ilda | .................... B01D 46/2429 |
| 2018/0264453 A1* | 9/2018 | Kuki | ................. C04B 38/0012 |

FOREIGN PATENT DOCUMENTS

| | | | | |
|---|---|---|---|---|
| CN | 101316804 A | 12/2008 | | |
| CN | 108571356 A | 9/2018 | | |
| EP | 2043964 B1 * | 6/2013 | ......... | B01D 46/2429 |
| JP | 2009-292709 A | 12/2009 | | |
| JP | 4954705 B2 | 6/2012 | | |
| JP | 5897242 B2 | 3/2016 | | |

OTHER PUBLICATIONS

Japanese Office Action (with English translation), Japanese Application No. 2020-054282, dated Sep. 6, 2022 (8 pages).
Chinese Office Action (with English translation), Chinese Application No. 202010222314.1, dated May 10, 2022 (15 pages).

* cited by examiner

*Primary Examiner* — Elizabeth Collister
(74) *Attorney, Agent, or Firm* — Burr Patent Law, PLLC (57) ABSTRACT

A ceramic porous body including: skeleton portions including an aggregate and at least one bonding material; and pore portions formed between the skeleton portions, the pore portions being capable of allowing a fluid to flow therethrough, wherein the pore portions have a pore volume ratio of pores having a pore diameter of from 10 to 15 μm, of from 4 to 17%.

12 Claims, 2 Drawing Sheets

CERAMIC POROUS BODY AND METHOD FOR PRODUCING THE SAME, AND DUST COLLECTING FILTER

FIELD OF THE INVENTION

The present invention relates to a ceramic porous body and a method for producing the same, as well as a dust collecting filter.

BACKGROUND OF THE INVENTION

A large amount of particulate substances such as soot (hereinafter also referred to as "particulate matters" or "PMs") is contained in exhaust gases discharged from internal combustion engines such as diesel engines and gasoline engines, and various combustion devices. When the PMs are directly discharged into the atmosphere, environmental pollution is caused. Therefore, an exhaust system for an exhaust gas is equipped with a dust collecting filter (hereinafter also referred to as "particulate filter") for collecting the PMs. Examples of the dust collecting filter includes a diesel particulate filter (DPF) and a gasoline particulate filter (GPF) used for purifying exhaust gases discharged from diesel engines or gasoline engines, and the like. In such DPF and GPF, a ceramic porous body is used that has a honeycomb structure in which a plurality of cells penetrating from a first end face to a second end face to form flow paths for an exhaust gas are defined by partition walls. In addition, the ceramic porous body used for the purpose is required to have a pore structure that increases a PM collection ratio.

Further, as the ceramic porous body used for the dust collecting filter is used, particulate matters such as soot are deposited on a surface or an inner side of the ceramic porous body. This results in an increased pressure loss of the ceramic porous body, so that a collecting capacity as a dust collection filter will not be sufficiently obtained. Therefore, to regenerate the collecting capacity as a dust collecting filter, a regeneration treatment is carried out for burning and removing the particulate matters deposited on the surface or inner side of the porous ceramic body on a regular basis. From the viewpoint of stably carrying out the regeneration treatment, the porous ceramic body is also required to have durability against the regeneration treatment.

Further, the exhaust gas as stated above also contains harmful substances such as $NO_R$, CO and HC. Catalytic reaction is widely used when reducing an amount of harmful substances in the exhaust gas to purify the exhaust gas. In the purification of the exhaust gas utilizing such a catalytic reaction, a ceramic porous body having the above honeycomb structure is also used as a support for supporting an exhaust gas purifying catalyst such as a SCR catalyst. From the viewpoint of enhancing exhaust gas purification performance, the ceramic porous body used for the purpose is required to have a pore structure capable of supporting a large amount of an exhaust gas purification catalyst.

As a conventional ceramic porous body used for the above applications, for example, Patent Literature 1 discloses a ceramic porous body composed of pores having a pore diameter wherein a median pore diameter (d50) is 10 μm or more, a ratio: (median pore diameter (d50)–median pore diameter (d10))/median pore diameter (d50) is less than 0.8, and less than 5% of the total porosity has a pore diameter of less than 1.0 μm.

Patent Literature 2 proposes a porous ceramic body wherein a pore volume of 15 μm or less and a pore volume of 40 μm or more per unit volume are 0.7 cc/cc or less, respectively.

CITATION LIST

Patent Literatures

[Patent Literature 1] Japanese Patent No. 5897242 B
[Patent Literature 2] Japanese Patent No. 4954705 B

SUMMARY OF THE INVENTION

The present invention relates to: a ceramic porous body comprising: skeleton portions including an aggregate and at least one bonding material; and pore portions formed between the skeleton portions, the pore portions being capable of allowing a fluid to flow therethrough, wherein the pore portions have a pore volume ratio of pores having a pore diameter of from 10 to 15 μm, of from 4 to 17%.

The present invention also relates to:
a method for producing a ceramic porous body, comprising the steps of forming a green body to provide a formed body, the green body comprising: an aggregate; at least one bonding material; at least one firing aid; and at least one binder; and firing the formed body;
wherein the aggregate has a 50% particle diameter $D_{50}$ of from 15 to 30 μm and a ratio: (90% particle diameter $D_{90}$–10% particle diameter $D_{10}$)/50% particle diameter $D_{50}$ of 1.0 or less in a cumulative particle diameter distribution on a volume basis; and
wherein the firing aid is incorporated in an amount of 1.0 to 4.0 parts by mass based on a total amount of 100 parts by mass of the aggregate and the binder.
Furthermore, the present invention relates to a dust collecting filter comprising the ceramic porous body.

According to the present invention, it is possible to provide a porous ceramic body which has improve durability and can improve exhaust gas purification performance when used as a dust collecting filter, and a method for producing the same.

According to the present invention, it is possible to provide a dust collecting filter having improved durability and higher exhaust gas purification performance.

DETAILED DESCRIPTION OF THE INVENTION

Although Patent Literatures 1 and 2 focus on the pore structures of the ceramic porous bodies, it cannot be said that those pore structures are optimal. Therefore, the use of each of those porous ceramic bodies as a dust collecting filter causes a problem that exhaust gas purification performance is not sufficient. It should be noted that the term "exhaust gas purification performance" as used herein means both PM trapping performance and purification performance of harmful substances such as $NO_R$.

The present invention has been made in order to solve the above problems. An object of the present invention is to provide a ceramic porous body which has improved durability and can improve the exhaust gas purification performance when used as a dust collecting filter, and a method for producing the same.

Further, an object of the present invention is to provide a dust collection filter having improved durability and higher exhaust gas purification performance.

As a result of intensive studies to solve the above problems, the present inventors have focused on the fact that a pore volume ratio of a pore diameter of from 10 to 15 μm of a ceramic porous body is closely related to durability and exhaust gas purification performance, and found that by controlling the pore volume ratio of the pore diameter of from 10 to 15 μm of the ceramic porous body to a specific range, the durability and exhaust gas purification performance can be improved, and they have completed the present invention.

Hereinafter, preferred embodiments of a ceramic porous body and a method for producing the same as well as a dust collecting filter according to the present invention will be specifically described, but the present invention should not be construed as being limited thereto, and various modifications and improvements may be made based on the knowledge of a person skilled in the art, without departing from the spirit of the present invention. A plurality of elements disclosed in each embodiment can form various inventions by proper combinations. For example, some elements may be deleted from all the elements described in the embodiments, or elements of different embodiments may be optionally combined.

Embodiment 1

Figure 1:
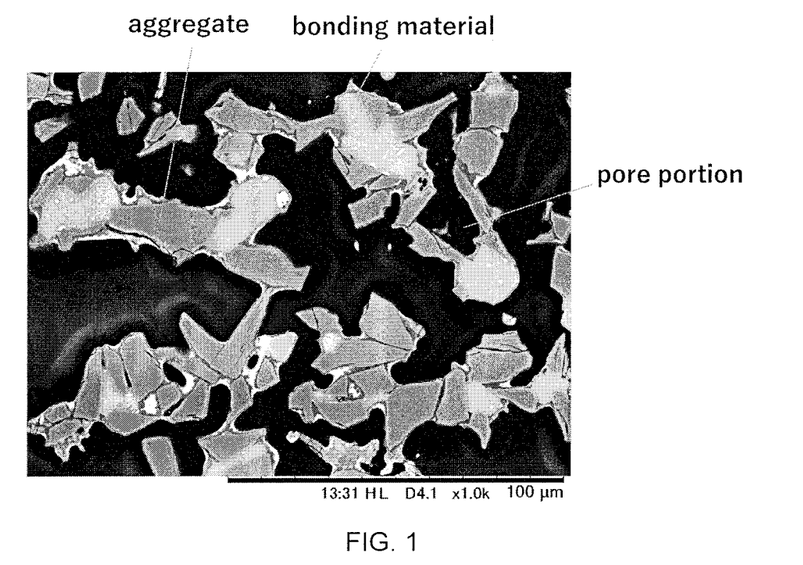
FIG. 1 is a SEM image of a ceramic porous body according to Embodiment 1.

FIG. 1 is a SEM image of a ceramic porous body of the present embodiment.

As shown in FIG. 1, the porous ceramic body of the present embodiment includes: skeleton portions including an aggregate and a bonding material; and pore portions formed between the skeleton portions and capable of allowing a fluid to flow therethrough.

Here, the pore diameter and the pore volume ratio in the pore portions are related to various characteristics such as durability and exhaust gas purification performance of the ceramic porous body, and when the pore volume ratio of the pore having a lower pore diameter is increased, the durability tends to be improved, while the purification performance of harmful substances such as $NO_x$ tends to be decreased. In particular, it is conventionally believed that smaller pores having a pore diameter of 15 μm or less are desirable to have a lower pore volume ratio, because the small pores having a pore diameter of 15 μm or less are difficult to allow an exhaust gas to flow therethrough and have a little contribution to improvement of purification performance of harmful substances.

However, as a result of studies, the present inventors have found that pores having a pore diameter of from 10 to 15 μm have an significant effect on the purification performance of harmful substances, and the controlling of the pore volume ratio is effective to improve the purification performance of harmful substances.

Therefore, in the ceramic porous body of the embodiment, the pore volume ratio of pores having a pore diameter of from 10 to 15 μm is controlled to 4 to 17%. The pore volume ratio in the above range can allow both the purification performance of harmful substances and the durability to be improved. The pore volume ratio is preferably from 5 to 13% in terms of stably obtaining the effects as described above.

As used herein, the "pore diameter" refers to a pore diameter in a pore distribution determined by a mercury intrusion method according to JIS R 1655: 2003.

Further, the pores having a pore diameter of less than 10 μm have a little contribution to the improvement of the purification performance of harmful substances, and it is thus desirable that the pores are smaller. Therefore, the pore volume ratio of the pores having a pore diameter of less than 10 μm is preferably 9.5% or less, and more preferably 7% or less. The pore volume ratio in the above range can lead to improvement of the purification performance of harmful substances.

Further, a number of pores having a pore diameter of more than 40 μm is preferably lower, because an increased number of that pores may decrease the durability and PM trapping performance. Therefore, the pore volume ratio of the pores having a pore diameter more than 40 μm is preferably 17% or less, more preferably 14% or less. The pore volume ratio in the above range can lead to improvement of both the durability and the PM trapping performance.

The aggregate used for the skeleton portions is not particularly limited, and known aggregates in the technical field may be used. Among them, the aggregate is preferably silicon carbide, silicon nitride, aluminum nitride, mullite, titanium oxide or a composite oxide containing the same (for example, aluminum titanate). By using such a material as an aggregate, a ceramic porous body having improved strength and improved thermal shock resistance can be obtained.

An average particle diameter of the aggregate is preferably 40 μm or less, and more preferably 30 μm or less. By using the aggregate having such an average particle diameter, coarse skeleton portions will be difficult to be formed, and the pore portions having good communicability will be easily formed between the skeleton portions. A lower limit of the average particle diameter of the aggregate is not particularly limited, but it may preferably be 10 μm, and more preferably 15 μm.

The "average particle diameter" as used herein refers to a particle diameter at an integrated value 50% in a cumulative particle size distribution (on a volume basis) obtained by the laser diffraction/scattering method.

The bonding material used for the skeleton portions is not particularly limited, and known bonding materials in the technical field can be used. Among them, the bonding material is preferably at least one selected from the group consisting of metallic silicon, silicon carbide, aluminum oxide and a composite oxide containing the same (for example, cordierite). By using such a bonding material with a suitably selected ratio to the aggregate, a porous ceramic body having improved thermal conductivity can be obtained.

Although silicon carbide is also used as the aggregate, it also acts as the bonding material depending on the types of aggregates used together and the firing temperatures. For example, when an organic material containing Si and C is used as a raw material together with silicon carbide as an aggregate, silicon carbide produced by reactive sintering of the organic material at about 1800° C. acts as a bonding material.

Each skeleton portion may further contain oxides derived from a firing aid. Here, the type of the oxides derived from the firing aid can be identified from the type of the firing aid to be used and the firing temperature.

The firing aid is not particularly limited, and any material known in the art can be used. The firing aid generally contains a compound containing an alkaline earth metal element(s). Examples of the compound containing an alkaline earth metal(s) include fluorides, carbides, chlorides, silicides, carbonates, hydroxides, oxides, inorganic acid salts and organic acid salts of calcium, magnesium or strontium. These can be used alone or in combination of two or more. The firing aid may further contain a compound containing an element(s) other than the alkaline earth metal element, in terms of controlling the melting point of the firing aid.

The firing aid is preferably a mixture including a compound containing strontium and a compound containing aluminum. Here, each compound may contain two or more metal elements. For example, the firing aid is a mixture including strontium oxide and aluminum oxide, or a raw material which provides the mixture during the firing. Examples of the raw material which provides strontium oxide during the firing include strontium carbonate. Examples of the raw material which provides aluminum oxide during the firing include aluminum hydroxide.

A porosity of the ceramic porous body is not particularly limited, but it may preferably be 55% or more, and more preferably 60% or more. The porosity in such a range allows for ensuring easy flow of an exhaust gas. On the other hand, the upper limit of the porosity is not particularly limited, but it may preferably be 68%, and more preferably 65%. The above upper limit of the porosity can ensure the durability.

The "porosity" as used herein refers to a porosity measured by mercury porosimetry according to JIS R 1655: 2003.

The porous ceramic body having the above features can be produced by a method including the steps of forming a green body containing an aggregate, a bonding material, a firing aid, a pore former and a binder to obtain a formed body, and firing the formed body.

In this method, the aggregate has a 50% particle diameter $D_{50}$ of from 15 to 30 μm, preferably from 16 to 28 μm, more preferably from 18 to 26 μm, in the cumulative particle diameter distribution on a volume basis. The aggregate has a ratio: (90% particle diameter $D_{90}$–10% particle diameter $D_{10}$)/50% particle diameter $D_{50}$ of 1.0 or less, preferably 0.8 or less, in the cumulative particle diameter distribution on a volume basis. The use of the aggregate having such a particle diameter distribution as a raw material can reduce pores having a pore diameter of less than 10 μm, which have a little contribution to improvement of purification performance of harmful substances, and pores having a pore diameter more than 40 μm, which may decrease durability and/or PM trapping performance. Therefore, a ceramic porous body having a desired pore structure can be obtained.

As used herein, the 50% particle diameter $D_{50}$ means a particle diameter at an integrated value of 50% in a cumulative particle diameter distribution (on a volume basis) determined by a laser diffraction/scattering method. Similarly, the 90% particle diameter $D_{50}$ and the 10% particle diameter $D_{10}$ mean particle diameters at integrated values of 90% and 10% in the cumulative particle diameter distributions (on a volume basis) determined by the laser diffraction/scattering method, respectively.

The 90% particle diameter $D_{90}$ of the aggregate is not particularly limited, but it may preferably be from 10 to 45 μm, and more preferably from 20 to 40 μm. The 10% particle diameter $D_{10}$ of the aggregate is not particularly limited, but it may preferably be from 5 to 20 μm, and more preferably from 10 to 18 μm. The use of the aggregate having such a particle diameter distribution as a raw material can allow the above effects to be stably obtained.

An amount of the aggregate and the bonding material incorporated may be appropriately set depending on the type and is not particularly limited. The mass ratio of the aggregate and the bonding material is preferably 70:30 to 85:15. The content in such a range can allow the ceramic porous body having a desired pore structure to be easily obtained.

The firing aid has an effect of increasing wettability between the aggregate and the bonding material. Therefore, a higher content of the firing aid increases a contact area between the aggregate and the bonding material during firing, so that durability (strength) is improved, while it is difficult to obtain a desired pore structure.

Therefore, the ratio of the firing aid incorporated is from 1.0 to 4.0 parts by mass, preferably from 1.8 to 3.2 parts by mass, based on a total amount of 100 parts by mass of the aggregate and the bonding material, in terms of obtaining a desired pore structure while improving durability.

Further, the pore former is incorporated in order to adjust the porosity or a pore diameter of the ceramic porous body. The pore former is not particularly limited, and any known pore former in the art can be used. Examples of the pore former include graphite, wheat flour, crosslinked starch, foamed resins, phenol resins, poly(methyl methacrylate), polyethylene, polyethylene terephthalate, and the like. These can be used alone or in combination of two or more.

The 50% particle diameter $D_{50}$ of the pore former is not particularly limited, but it may preferably be from 25 to 45 μm, and more preferably from 30 to 40 μm. Further, a ratio: (90% particle diameter $D_{90}$–10% particle diameter $D_{10}$)/50% particle diameter $D_{50}$ of the pore former is not particularly limited, but it may preferably be 1.2 or less, and more preferably 1.0 or less. The use of the pore former having such a particle diameter distribution as a raw material can easily provide a ceramic porous body having a desired pore diameter and porosity.

The 90% particle diameter $D_{90}$ of the pore former is not particularly limited, but it may preferably be from 10 to 60 μm, and more preferably from 20 to 50 μm. The 10% particle diameter $D_{10}$ of the pore former is not particularly limited, but it may preferably be from 5 to 23 μm, and more preferably from 10 to 22 μm. The use of the pore former having such a particle diameter distribution as a raw material can allow the above effects to be stably obtained.

The ratio of the pore former incorporated in the green body may be appropriately set depending on the type and is not particularly limited. It may preferably be from 5 to 35 parts by mass, more preferably from 10 to 30 parts by mass, even more preferably from 15 to 25 parts by mass, based on 100 parts by mass of the aggregate and the bonding material.

The binder is not particularly limited, and binders known in the art can be used. Examples of the binder include organic binders such as methyl cellulose and hydroxypropoxyl methyl cellulose, and inorganic binders such as montmorillonite and sepiolite. These can be used alone or in combination of two or more.

An amount of the binder incorporated in the green body may be set as needed depending on the type and is not particularly limited. It may preferably be from 3 to 17 parts by mass, more preferably from 5 to 15 parts by mass, even more preferably from 7 to 13 parts by mass, based on the total amount of 100 parts by mass of the aggregate and the bonding material.

The green body can be obtained by mixing and kneading the above raw materials. A method for mixing and kneading the raw materials is not particularly limited, and it can be carried out by a method known in the art. For example, the mixing and kneading of the raw materials can be carried out using a kneader, a vacuum green body kneader or the like.

Similarly, a method for forming the green body is not particularly limited, and it can be carried out by a method known in the art, for example extrusion molding.

The formed body may be calcined before the firing in order to remove (degrease) the organic binder contained in the formed body. The calcination is preferably performed at a temperature lower than a temperature at which metallic silicon is melted. More particularly, it may be once held at a predetermined temperature of from about 150 to 700° C., or it may be calcined by slowing down a rate of temperature rising to 50° C./hour or less in the predetermined temperature range.

The method of being once held at the predetermined temperature may be holding only at one temperature level or holding at a plurality of temperature levels, depending on the type and amount of the organic binder used. Further, in case of holding at plurality of temperature levels, the holding times may be the same as or different from each other. Similarly, the method of slowing down the rate of the temperature rising may be slowing only in a certain temperature zone or in a plurality of zones. Further, in the case of the plurality of zones, the rates may be the same as or different from each other.

An atmosphere of the calcination may be an oxidizing atmosphere. However, when the formed body contains a large amount of organic binder, the organic binder vigorously burns out with oxygen during the calcination and the temperature of the formed body may be sharply increased. Therefore, the calcination may be carried out in an inert atmosphere such as $N_2$ and Ar to suppress abnormal temperature rise of the formed body. The suppression of the abnormal temperature rise is an important control when a raw material having a higher thermal expansion coefficient (i.e., which is weak against thermal shock) is used. In addition to the case where the aggregate is silicon carbide particles, even in the case where oxidation at elevated temperature is concerned, the calcination is preferably carried out in the inert atmosphere, at least at a temperature higher than or equal to an oxidation initiating temperature, to suppress oxidation of the formed body.

The calcination and subsequent firing may be carried out in different steps in the same furnace or different furnaces or may be a continuous step in the same furnace. Although the former method is also a preferred approach when the calcination and the firing are performed in different atmospheres, the latter method is also preferable from the standpoint of the total firing time, operating cost of the furnace and the like.

The atmosphere of the firing may be determined according to the type of aggregate. For example, when using an aggregate which is concerned about oxidation at an elevated temperature, a non-oxidizing atmosphere such as $N_2$ and Ar is preferred, at least in a temperature range higher than or equal to an oxidation initiating temperature.

The ceramic porous body according to the present embodiment produced as described above has the pore volume ratio of a pore diameter of from 10 to 15 μm controlled within the appropriate range, so that durability and exhaust gas purification performance can be improved.

Embodiment 2

A porous ceramic body according to the present embodiment has a honeycomb structure in which a plurality of cells penetrating from a first end face to a second end face to form fluid flow paths are defined by partition walls. In the ceramic porous body having such a honeycomb structure, the partition walls correspond to the ceramic porous body. Further, in the ceramic porous body having the honeycomb structure, "a direction parallel to a flow direction of a fluid" refers to a direction orthogonal to a cell extending direction, and "a flow direction of a fluid" refers to a thickness direction of the partition wall.

The ceramic porous body according to the present embodiment is the same as the ceramic porous body of Embodiment 1, with the exception that the former has a predetermined honeycomb structure. Therefore, the descriptions of the configuration common to Embodiment 1 will be omitted here, and only parts different from those of Embodiment 1 will be described.

Figure 2:
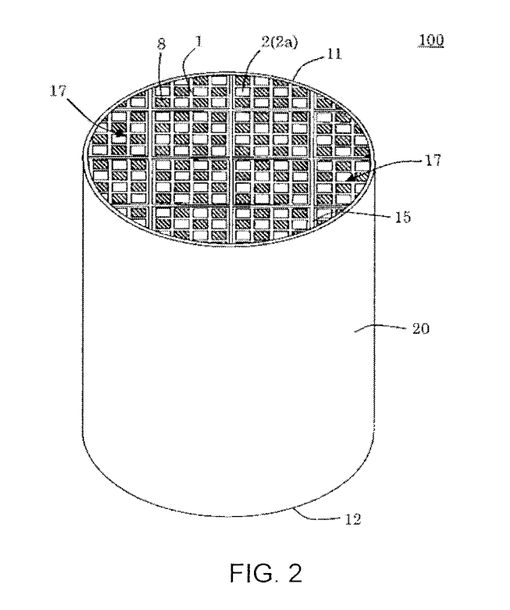
FIG. 2 is a perspective view schematically illustrating a ceramic porous body according to Embodiment 2.
Figure 3:
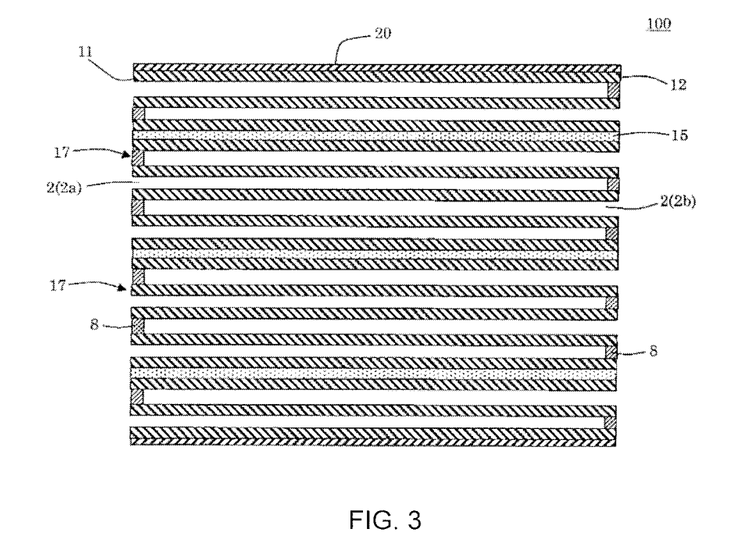
FIG. 3 is a cross-sectional view schematically illustrating a cross section parallel to an extending direction of cells of a porous ceramic body according to Embodiment 2.

FIG. 2 is a perspective view schematically illustrating the ceramic porous body according to the present embodiment. FIG. 3 is a cross-sectional view schematically illustrating a cross section parallel to an extending direction of cells of the porous ceramic body according to the present embodiment extend.

As shown in FIGS. 2 and 3, the porous ceramic body (hereinafter, referred to as a "honeycomb structure 100") according to the present embodiment includes: a plurality of pillar shaped honeycomb segments 17; and joined layers 15 disposed among side surfaces of the plurality of honeycomb segments 17. Such a segment structure can lead to reduction of a stress received by the honeycomb structure 100 when the honeycomb structure 100 is used as a dust collection filter.

Each pillar shaped honeycomb segment 17 includes partition walls 1 that define a plurality of cells 2 penetrating from a first end face 11 to a second end face 12 to form flow paths for a fluid.

A thickness of each partition wall 1 is not particularly limited, but it may preferably be from 100 to 500 μm, and more preferably from 150 to 450 μm, and further preferably from 125 to 400 μm. The thickness of each partition wall 1 of 100 μm or more sufficiently ensures the strength of the partition walls 1, so that it is difficult for the honeycomb structure 100 to be damaged when the honeycomb structure 100 is stored in a can body. Further, the thickness of each partition wall 1 of 500 μm or less can allow an increase in pressure loss to be suppressed.

A cell density in each honeycomb segment 10 is not particularly limited, but it may preferably be from 15 to 100 cells/cm$^2$, and more preferably from 30 to 65 cells/cm$^2$, and still more preferably from 30 to 50 cells/cm$^2$. The cell density of 15 cells/cm$^2$ or more ensures the strength of the partition walls 1, so that it is difficult for the honeycomb structure 100 to be damaged when the honeycomb structure 100 is stored in a can body. The cell density of 100 cells/cm$^2$ or less can allow an increase in pressure loss to be suppressed.

The shape of the cell 2 is not particularly limited, and it may be a shape known in the art. As used herein, "the shape of the cell 2" refers to the shape of each cell 2 in a cross section in a direction orthogonal to an extending direction of the cell 2. Examples of the shape of the cell 2 include circles, quadrangles, hexagons, octagons, and the like. In particular, among the quadrangles, a square or a rectangle is preferable.

The shape of the honeycomb structure 100 is not particularly limited, and it may be a pillar shape in which end faces (the first end face 11 and the second end face 12) are circular (a cylindrical shape); a pillar shape in which end faces are oval; and a pillar shape in which end faces are polygonal (for example, pentagonal, hexagonal, heptagonal, octagonal, etc.); and the like.

The length from the first end face 11 to the second end face 12 of the honeycomb structure 100 and the size of the cross section orthogonal to the extending direction of the cells 2 may be optionally set according to working conditions and use application of the honeycomb structure 100, and is not particularly limited.

As shown in FIGS. 2 and 3, the honeycomb structure 100 may include plugged portions 8 arranged on opening portions of certain cells 2 (outflow cells 2b) on the first end face 11 and on opening portions of remaining cells 2 (inflow cells 2a) on the second end face 12. When the honeycomb structure 100 is used for a DPF or the like, such a structure is preferable. That is, due to the plugged portions 8, an exhaust gas flowing in the honeycomb structure 100 is filtered by the partition walls 1, so that particulate matters in the exhaust gas can be satisfactorily collected. In the honeycomb structure 100, the inflow cells 2a and the outflow cells 2b are alternately arranged. Accordingly, a checkered pattern formed by the plugged portions 8 and the openings of the cells 2 appears on each of the first end face 11 and the second end face 12 of the honeycomb structure 100.

The plugged portions 8 and the honeycomb segments 17 may be made of the same material or different materials.

The honeycomb structure 100 may have an outer peripheral coat layer 20 on the outer peripheral surface. The outer peripheral coat layer 20 can be made of the same material as that of the honeycomb segments 17. By forming the outer peripheral coat layer 20, it is difficult to generate defects such as breakage even if the honeycomb structure 100 is subjected to an external force during transportation or the like.

Figure 4:
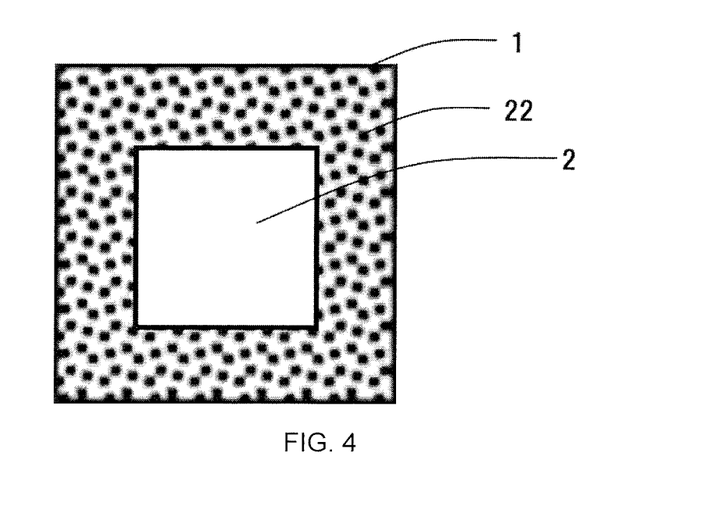
FIG. 4 is a partially enlarged cross-sectional view illustrating an enlarged part of a cross section orthogonal to an extending direction of cells, in a honeycomb catalyst body including a porous ceramic body according to Embodiment 2.

The honeycomb structure 100 can be used as a honeycomb catalyst body for purifying components to be purified such as carbon monoxide contained in an exhaust gas by supporting a catalyst on the partition walls 1. For example, as shown in FIG. 4, a catalyst 22 can be attached so as to fill the pores of the partition walls 1 that define the cells 2. FIG. 4 is a partially enlarged cross-sectional view illustrating an enlarged part of a cross section orthogonal to the extending direction of the cells in the honeycomb catalyst body to which the porous ceramic body according to the present embodiment has been applied. Further, in FIG. 4, the catalyst 22 is distributed in the form of dots, although the distribution state of the catalyst 22 is not particularly limited.

As the catalyst 22, those known in the art can be used. Examples of the catalyst 22 include a three-way catalyst for purifying an exhaust gas of a gasoline engine, an oxidation catalyst for purifying an exhaust gas of a gasoline engine or a diesel engine, and an SCR catalyst for selective reduction of $NO_x$. Specific examples of the catalyst 22 that can be used include noble metals such as platinum, palladium, rhodium, iridium, and silver; oxides such as alumina, zirconia, titania, ceria, and iron oxide; and simple substances or compounds containing copper ion-exchanged zeolite. These can be used alone or in combination of two or more.

A method for producing the honeycomb structure 10 having the above features is not particularly limited and can be carried out in accordance with a method known in the art. More particularly, the method for producing the honeycomb structure 10 can be carried out as follows:

First, each honeycomb segment 17 can be produced in the same method as that of Embodiment 1, with the exception that a green body is formed into a pillar shaped formed body having the honeycomb structure (a formed body corresponding to the shape of the honeycomb segment 17) by extrusion molding. The extrusion molding can be carried out using a die having a desired cell shape, partition wall thickness and cell density. The pillar shaped formed body thus obtained may be dried before firing. A non-limiting drying method may be hot air drying, microwave drying, dielectric drying, reduced pressure drying, vacuum drying, freeze drying and the like. Among them, the dielectric drying, the microwave drying and the hot air drying may be carried out alone or in combination with one another. The drying may be carried out under conditions at a drying temperature of from 30 to 150° C. for a drying time of from 1 minute to 2 hours, but not particularly limited to thereto. As used herein, the "drying temperature" refers to a temperature of an atmosphere in which the drying is carried out.

The pillar shaped formed body obtained or its dried body is plugged. The method for plugging the opening portions of the cells 2 may employ a method for filling the opening portions of the cells 2 with the plugging material. The method for filling them with the plugging material can be carried out in accordance with a conventionally known method for a honeycomb structure 100 provided with plugged portions 8. For a plugged portion-forming raw material for the plugging, a plugged portion-forming raw material may be used, which is used for a conventionally known method for producing a honeycomb structure 100.

The plugged pillar shaped formed body or its dried body is then calcined to remove (degrease) the organic binder, and the main firing is then carried out to obtain a honeycomb segment 17. The resulting honeycomb segment 17 may be further subjected to a heat treatment in an oxygen-containing atmosphere to form an oxide film on the surface.

A joining material is then applied to the side surfaces of the honeycomb segments 17 obtained above, and the honeycomb segments 17 are arranged adjacent to each other such that the side surfaces of the honeycomb segments 17 face each other. After the adjacent honeycomb segments 17 are pressure-bonded to each other and dried by heating to produce the honeycomb structure 100. At this time, joined layers are formed from the joining material by heating and drying.

The joining material is not particularly limited. For example, the joining material that can be used includes materials obtained by mixing ceramic powder, a dispersion medium (e.g., water), and optionally additives such as a binder, a deflocculant, and a foaming resin. Non-limiting examples of the ceramic include ceramics containing at least one selected from the group consisting of cordierite, mullite, zircon, aluminum titanate, silicon carbide, silicon nitride, zirconia, spinel, indialite, sapphirine, corundum, and titania. Preferably, the ceramic is made of the same material as that of the honeycomb segment 17. Examples of the binder that can be used include polyvinyl alcohol, methyl cellulose, CMC (carboxymethyl cellulose), and the like.

Next, for the honeycomb structure 100 obtained as described above, the outer peripheral portion may be ground as needed into a desired shape (for example, a pillar shape), and the outer peripheral surface may be coated with an outer peripheral coating material and then dried by heating to form an outer peripheral wall.

EXAMPLES

Hereinafter, while the present invention will be more specifically described with reference to Examples, the present invention is not limited to these Examples.

Example 1

Silicon carbide (aggregate) having the particle size distribution as shown in Table 1, metallic silicon (bonding material), crosslinked starch (pore former) having the particle size distribution as shown in Table 1, strontium carbonate (firing aid), aluminum hydroxide (firing aid), and binders (hydroxy propyl methyl cellulose (hereinafter abbreviated as "HPMC") and montmorillonite) were blended in the proportions as shown in Table 1, and water was added and then mixed. Subsequently, the mixture was kneaded with a kneader, and then kneaded with a vacuum soil kneader to obtain a greed body. The green body thus obtained was formed into a quadrangular pillar shaped honeycomb structure having a length of one side of the end face of 36 mm, a thickness of the partition wall of 300 μm, and a cell density of 46 cells/cm$^2$, by means of an extruder. The resulting formed body was then subjected to microwave drying and then dried with hot air at 120° C. to obtain a dried body. Next, for the resulting dried honeycomb body, plugged portions were formed at one end of certain cells and the other end of the remaining cells. The certain cells and the remaining cells were alternately arranged so that a checkered pattern was formed on both end faces by the opening portions and the plugged portions of the cells. As a filler for plugging, the same material as that of the honeycomb formed body was used. Next, after the resulting plugged honeycomb dried body was degreased in the air at 450° C. for 5 hours, the degreased dried body was fired in an Ar atmosphere at 1430° C. for 2 hours to obtain a honeycomb segment.

Next, the joining material was applied to the side surface of the honeycomb segment and joined to the side surface of the other honeycomb segment. This step was repeated to produce a laminate having a total of 16 honeycomb segments in which 4 honeycomb segments in the vertical direction by 4 honeycomb segments in the crosswise direction were joined. The honeycomb segments were then pressed together by applying a pressure from the outside, and then dried at 140° C. for 2 hours to obtain a joined body. The outer periphery of the joined body was ground such that the cross section orthogonal to the cell extending direction of the resulting joined body was circular. The outer peripheral coating material having the same composition as that of the joining material was applied to the processed surface, and then dried at 700° C. for 2 hours to form an outer peripheral coat layer, thereby obtaining a honeycomb structure.

Examples 2 to 6 and Comparative Examples 1 to 3

Each honeycomb structure was obtained under the same conditions as those of Example 1, with the exception that the raw materials and the mixing ratio used were changed as shown in Table 1. In Example 5, HPMC and sepiolite were used as the binders.

TABLE 1

|  |  | Example |  |  |  |  |  | Comparative Example |  |  |
|---|---|---|---|---|---|---|---|---|---|---|
|  |  | 1 | 2 | 3 | 4 | 5 | 6 | 1 | 2 | 3 |
| Aggregate | Silicon Carbide [parts by mass] | 80 | 80 | 80 | 80 | 80 | 80 | 75 | 75 | 80 |
|  | D10 [μm] | 12.8 | 12.8 | 12.8 | 15.3 | 15.3 | 12.8 | 20.6 | 20.6 | 2.4 |
|  | D50 [μm] | 19.3 | 19.3 | 19.3 | 25.2 | 25.2 | 19.3 | 31.5 | 31.5 | 26.9 |
|  | D90 [μm] | 30.8 | 30.8 | 30.8 | 39.6 | 39.6 | 30.8 | 51.1 | 51.1 | 47.2 |
|  | $(D_{90} - D_{10})/D_{50}$ | 0.9 | 0.9 | 0.9 | 1.0 | 1.0 | 0.9 | 1.0 | 1.0 | 1.7 |
| Binding Material | Metallic Silicon [parts by mass] | 20 | 20 | 20 | 20 | 20 | 20 | 25 | 25 | 20 |
| Pore Former | Crosslinked Starch [parts by mass] | 19 | 19 | 19 | 19 | 19 | 19 | 15 | 15 | 12 |
|  | D10 [μm] | 15.3 | 15.3 | 21.5 | 21.5 | 21.5 | 15.3 | 23.6 | 23.6 | 23.6 |
|  | D50 [μm] | 29.5 | 29.5 | 33.3 | 33.3 | 33.3 | 29.5 | 44.7 | 44.7 | 44.7 |
|  | D90 [μm] | 48.8 | 48.8 | 46.7 | 46.7 | 46.7 | 48.8 | 75.0 | 75.0 | 75.0 |
|  | $(D_{90} - D_{10})/D_{50}$ | 1.1 | 1.1 | 0.8 | 0.8 | 0.8 | 1.1 | 1.2 | 1.2 | 1.2 |
|  | Foamed Resin [parts by mass] | — | — | — | — | — | — | — | 5 | — |
|  | D10 [μm] | — | — | — | — | — | — | — | 17.8 | — |
|  | D50 [μm] | — | — | — | — | — | — | — | 50.4 | — |
|  | D90 [μm] | — | — | — | — | — | — | — | 84.3 | — |
|  | $(D_{90} - D_{10})/D_{50}$ | — | — | — | — | — | — | — | 1.3 | — |
| Firing Aid | Strontium Carbonate [parts by mass] | 1.4 | 2.8 | 2.1 | 2.1 | 2.1 | 2.1 | — | — | 1.4 |
|  | Aluminum Hydroxide [parts by mass] | 0.4 | 0.4 | 0.4 | 0.4 | 0.4 | 0.4 | — | — | 0.4 |
| Binder [parts by mass] |  | 10 | 10 | 10 | 10 | 10 | 10 | 8 | 8 | 8 |

The following evaluations were performed on the honeycomb structures obtained in the above Examples and Comparative Examples.

(Pore Volume Ratio and Porosity)

Using a mercury porosimeter (Autopore IV9500 from Micromeritics), the pore volume of pores having each pore diameter was measured. For example, the pore volume (mL/g) of pores having a pore diameter of from 10 to 15 μm was determined by subtracting an accumulated pore volume value of the pore diameter of 10 μm from an accumulated pore volume value of the pore diameter of 15 μm. The pore volume ratio of pores having a pore diameter of from 10 to 15 μm was calculated as a percentage of the pore volume of pores having a pore diameter of from 10 to 15 μm to the total pore volume. In addition, the total pore volume (mL/g) means volumes of all the pores per 1 g of the honeycomb structure. Further, the pore volume and the pore volume ratio of pores having other pore diameters were also determined in the same manner as described above.

The porosity was calculated by the following equation using the total pore volume (mL/g) and true density (g/mL) of the honeycomb structure.

Porosity=Total Pore Volume/(Total Pore Volume+1/ True Density of Honeycomb Structure)×100

($NO_x$ Purification Ratio)

100 g/L of SCR catalyst (copper ion-exchanged zeolite catalyst) for $NO_x$ selective reduction was supported on the partition walls of each honeycomb structure. Specifically, the honeycomb structure was immersed in a container containing a slurry of the SCR catalyst from one end face, and the slurry was sucked from the other end face to support the SCR catalyst on the partition walls. A test gas containing $NO_x$ flowed through the honeycomb structure, and an amount of NO), in the gas discharged from the honeycomb structure was analyzed by a gas analyzer to determine the $NO_x$ purification ratio.

At this time, a temperature of the test gas flowing in the honeycomb structure was 200° C. The temperature of the test gas was adjusted by a heater. The heater used was an infrared image furnace. The test gas used was a gas in which nitrogen was mixed with 5% by volume of carbon dioxide, 14% by volume of oxygen, 350 ppm (by volume) of nitrogen monoxide, 350 ppm (by volume) of ammonia, and 10% by volume of water. For the test gas, water and a mixed gas obtained by mixing other gases were separately prepared, and these were mixed and used in a pipe during the test. The gas analyzer used was "MEXA9100EGR" from HORIBA. A space velocity when the test gas flowed into the ceramic porous body was set to 100,000 (hour$^{-1}$). The "$NO_x$ Purification Ratio" is a value obtained by subtracting the $NO_x$ amount in the gas discharged from the ceramic porous body from the $NO_x$ amount in the test gas, dividing the subtracted value by the $NO_x$ amount in the test gas and multiplying the divided value by 100 (unit: %).

In the evaluation, the symbol "⊚" indicates that the $NO_x$ purification ratio was more than 70%, the symbol "○" indicates that the $NO_x$ purification ratio was more than 60% and 70% or less, and the symbol "s" indicates that the $NO_x$ purification ratio was more than 50% and 60% or less, and the symbol "X" indicates that the $NO_x$ purification ratio was 50% or less. If the $NO_x$ purification rate was more than 50% (if the evaluation results of "Δ", "○", and "⊚"), there is no practical problem. Therefore, they are determined to be acceptable.

(PM Collection Ratio)

Each honeycomb structure that supported an SCR catalyst by the same method as in the evaluation of the $NO_x$ purification ratio was attached to an exhaust gas exhaust pipe of a passenger vehicle equipped with a 2.0-liter diesel engine. The passenger vehicle traveled three times in an EUDC (Extra Urban Driving Cycle) mode, and then soaked (Soak: engine stopped) for 8 hours or more, and then traveled in a NEDC (New European Driving Cycle) mode. Based on both the cumulative number of particulate matters (PMs) at an exhaust gas outlet (outflow side) of the honeycomb structure that supported the SCR catalyst when traveling in the NEDC mode and the total number of PMs in the exhaust gas, the PM collection ratio was calculated by the following equation:

PM collection ratio [%]=(total number of PMs in exhaust gas−total number of PMs at exhaust gas outlet (outflow side) of honeycomb structure)/total number of PMs in exhaust gas×100.

The number of PMs was measured according to the method proposed in the particle measurement program (abbreviated as "PMP") by the Working Party on Pollution and Energy of the World Economic Forum for Automotive Regulations in the Economic Commission for Europe.

In the evaluation, the symbol "⊚" indicates that the PM collection ratio was more than 95%; the symbol "0" indicates that the PM collection ratio was more than 90% and 95% or less; and the symbol "Δ" indicates that the PM collection ratio was more than 80% and 90% or less; and the symbol "X" indicates that PM collection ratio was 80% or less. If the PM collection ratio is 80% (if evaluation results are "Δ", "○" and ⊚), an EURO6 regulation value of 6.0× 10$^{11}$/km can be satisfied and there is no practical problem, so that the PM collection ratio is determined to be acceptable.

(Isostatic Strength)

Measurement of the isostatic strength was carried out based on the isostatic breaking strength test as defined in M505-87 of the Japanese Automotive Standards Organization (JASO standard) issued by the Society of Automotive Engineers of Japan. The isostatic breaking strength test is conducted by placing a honeycomb structure in a rubber cylindrical container, covering the container with an aluminum plate, and subjecting it to isostatic pressure compression in water. That is, the isostatic breaking strength test simulates a compressive load when the outer peripheral surface of the honeycomb structure is gripped by the can body. The isostatic strength measured by the isostatic breaking strength test is indicated by a pressure value (MPa) when the honeycomb structure breaks.

In the evaluation, the symbol "0" indicates the isostatic strength was more than 2.0 MPa; the symbol "0" indicates that the isostatic strength was more than 1.5 MPa and 2.0 MPa or less; the symbol "A" indicates that the isostatic strength was more than 1.0 MPa and 1.5 MPa or less; and the symbol "X" indicates that the isostatic strength was 1.0 MPa or less. If the isostatic strength is more than 1.0 MPa (if the evaluation results are "A", "0", and "0"), there is no practical problem, so that the isostatic strength is determined to be acceptable.

(Crack Critical Temperature)

A crack critical temperature (the maximum temperature at which cracks are not generated in a honeycomb structure) was determined by a rapid heating test (burner spalling test) for flowing air heated by a burner through the honeycomb structure to create a temperature difference between a central part and an outer part of the honeycomb structure, and evaluating thermal shock resistance of the honeycomb structure. The test was sequentially conducted at test temperatures (temperatures of heated air) of 900° C., 1000° C., and 1100° C. Then, the generation of cracks in the honeycomb structure after the test was observed. For evaluation criteria, a case where no crack was generated even at the test temperature of 1100° C. was evaluated by "0"; a case where although no crack was not generated at the test temperature of 1000° C., cracks were generated at the test temperature of 1100° C. was evaluated by "0"; a case where although no crack was generated at the test temperature of 900° C., cracks were generated at the test temperature of 1000° C. was evaluated by "A", and a case where cracks were generated at the test temperature of 900° C. was evaluated by "X". If the crack critical temperature is 900° C. or higher (if the evaluation results are "A", "0", and "0"), there is no practical problem, so that the crack critical temperature is determined to be acceptable.

Table 2 shows the results of the above evaluations.

TABLE 2

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
| Pore Volume Ratio [%] | less than 10 μm | 9.0 | 5.0 | 6.6 | 3.1 | 2.7 | 7.6 | 14.0 | 0.5 | 9.8 |
|  | 10 to 15 μm | 16.6 | 12.3 | 12.0 | 6.9 | 4.5 | 14.5 | 24.4 | 17.2 | 3.5 |
|  | more than 15 μm and less than 20μm | 34.5 | 29.0 | 28.6 | 17.3 | 12.4 | 34.7 | 25.0 | 42.0 | 28.3 |
|  | more than 20 μm and 40 μm or less | 27.3 | 40.5 | 39.7 | 56.4 | 63.5 | 31.3 | 22.8 | 30.2 | 44.5 |
|  | more than 40 μm | 12.6 | 13.1 | 13.1 | 16.4 | 16.9 | 11.9 | 13.8 | 10.0 | 14.0 |
| Porosity [%] |  | 63 | 62 | 63 | 62 | 61 | 63 | 60 | 70 | 62 |
| NOx Purification Ratio |  | Δ | ⊚ | ⊚ | ⊚ | ○ | ○ | X | ○ | X |
| PM Collection Ratio |  | ⊚ | ⊚ | ⊚ | ○ | Δ | ⊚ | ○ | ○ | ○ |
| Isostatic Strength |  | ○ | ⊚ | ⊚ | ○ | ○ | ⊚ | Δ | X | Δ |
| Crack Critical Temperature |  | ○ | ○ | ○ | ○ | ○ | ○ | X | X | Δ |

As shown in Table 2, the honeycomb structures of Examples 1 to 6 in which the pore volume ratio of the pores having a pore diameter of from 10 to 15 μm was in the range of from 4 to 17% could achieve the acceptable criteria for all the evaluation items. However, the honeycomb structures of Comparative Examples 1 to 3 in which the pore volume ratio of the pores having a pore diameter of from 10 to 15 μm was beyond the range of from 4 to 17% could not the acceptable criteria for any of the evaluation items.

As can be seen from the above results, according to the present invention, it is possible to provide a porous ceramic body which has improved durability and can improve exhaust gas purification performance when used as a dust collecting filter, and a method for producing the same. Further, according to the present invention, it is possible to provide a dust collecting filter having imp'roved durability and higher exhaust gas purification performance.

DESCRIPTION OF REFERENCE NUMERALS

1 partition wall
2 cell
2a inflow cell
2b outflow cell
8 plugged portion
11 first end face
12 second end face
15 joined layer
17 honeycomb segment
20 outer peripheral coat layer
22 catalyst
100 honeycomb structure

The invention claimed is:

1. A fired ceramic porous body comprising: skeleton portions including an aggregate and at least one bonding material; and pore portions formed between the skeleton portions, the pore portions being capable of allowing a fluid to flow therethrough,
   wherein the pore portions have a pore volume ratio of pores having a pore diameter of from 10 to 15 μm, of from 4 to 17%, and
   wherein the aggregate is formed from a material that is different from the material forming the at least one bonding material.

2. The fired ceramic porous body according to claim 1, wherein the ceramic porous body has a porosity of 55% or more.

3. The fired ceramic porous body according to claim 1, wherein each of the pore portions has a pore volume ratio of pores having a pore diameter less than 10 μm of 9.5% or less.

4. The fired ceramic porous body according to claim 1, wherein each of the pore portions has a pore volume ratio of pores having a pore diameter more than 40 μm of 17% or less.

5. The fired ceramic porous body according to claim 1, wherein the aggregate is silicon carbide, titanium oxide, or a mixture thereof.

6. The fired ceramic porous body according to claim 1, wherein the bonding material is at least one selected from the group consisting of metallic silicon, aluminum oxide, and cordierite.

7. The fired ceramic porous body according to claim 1, wherein a catalyst is supported in the pores.

8. The fired porous ceramic body according to claim 1, wherein the porous ceramic body has a honeycomb structure, the honeycomb structure comprising partition walls that define a plurality of cells, each of the cells penetrating from a first end face to a second end face to form a flow path for a fluid.

9. The fired ceramic porous body according to claim 8, wherein the honeycomb structure comprises plugged portions provided at opening portions of certain cells on the first end face and at opening portions of the remaining cells on the second end face.

10. A method for producing the fired ceramic porous body according to claim 1, comprising the steps of:
   forming a green body to provide a formed body, the green body comprising: an aggregate; at least one bonding material; at least one firing aid; and at least one binder; and
   firing the formed body;
   wherein the aggregate has a 50% particle diameter D50 of from 15 to 30 μm and a ratio: (90% particle diameter D90–10% particle diameter D10)/50% particle diameter D50 of 1.0 or less in a cumulative particle diameter distribution on a volume basis; and
   wherein the firing aid is incorporated in an amount of 1.0 to 4.0 parts by mass based on a total amount of 100 parts by mass of the aggregate and the binder.

11. The method according to claim 10, wherein the pore former has a 50% particle diameter D50 of from 25 to 45 μm and a ratio: (90% particle diameter D90–10% particle diameter D10)/50% particle diameter D50 of 1.2 or less in a cumulative particle diameter distribution on a volume basis.

12. A dust collecting filter comprising the fired ceramic porous body according to claim 1.

* * * * *